3,006,903
POLYMERIZATION PROCESS
Albert J. Haefner, Baton Rouge, La., assignor to Ethyl Corporation, New York, N.Y., a corporation of Delaware
No Drawing. Filed Apr. 29, 1957, Ser. No. 655,470
6 Claims. (Cl. 260—92.8)

This invention relates to the polymerization of halogenated monomers. Specifically, the invention relates to a new and improved process for the production of a highly desirable polyvinyl chloride base resin which after formulation can be milled or calendered into thin transparent sheets or films or molded or extruded into rigid shapes.

Polyvinyl chloride is a highly desirable plastic for use in the molding and fabricating industries. One of four principal techniques is usually employed for this type of addition homopolymerization. The first is bulk polymerization which is a polymerization conducted by merely adding an oil soluble polymerization catalyst to the vinyl chloride monomer. The second is solution polymerization which differs from the bulk polymerization only in that a solvent is added to dilute the reaction mixture. A third type is emulsion polymerization, which uses a charge formed of vinyl chloride monomer, a water soluble polymerization catalyst, and a water soluble synthetic emulsifying agent. A fourth type is an aqueous suspension polymerization which presents several advantages over other polymerization methods. Especially is this method advantageous over emulsion polymerization in that the polymer may be separated directly by filtration without the necessity of first coagulating the polymer which, at best, is difficult and costly.

The suspension homopolymerization technique involves the polymerization of monomeric vinyl chloride under pressure and in the presence of a substantial excess of water, at moderately elevated temperatures and with a substantial degree of agitation. The polymerization is conducted with an added oil soluble catalyst, suitably of the peroxide type, such as benzoyl peroxide, lauroyl peroxide, or caprylyl peroxide, and various additives for facilitating the process, specifically wetting agents and stabilizing colloids such as methyl cellulose.

The base resin resulting from this process, while generally satisfactory, has been found lacking in certain of its resinous properties when formulated into an easily processable plastic. An easily processable plastic is one which has the properties of good flow and formability. These are essential properties for operations such as molding, pressing or extruding. Notable among the resin properties which suffer degradation are heat stability and heat distortion temperature. It is well known that vinyl chloride resins are highly sensitive to the effect of heat, and particularly when the heat is of the degree required to soften the resins so that they may be shaped into a desired form as by molding, milling, calendering or extrusion operations. The effect of heat is especially apparent on the normally colorless or transparent vinyl chloride resins. Its effect is to darken and eventually opacify the resins. The color changes through yellow to an amber shade, then becomes brown and finally becomes a blackened char. Heat stability then is defined as resistance to this degradation and a plastic which possesses high heat stability is highly resistant to this decomposition. Heat distortion temperature is another attribute which is important in certain applications. It is defined as that property of a plastic body by which it resists sheer deformation or bending when exposed to certain temperatures. The temperature at which such deformation occurs is defined as the heat distortion temperature. Both heat distortion temperature and heat stability are important for rigid applications.

It is accordingly an object of this invention to provide a new and improved process for the production of an easily processable polyvinyl chloride base resin which is suitable for formulation into a molding material which also has good properties of flow and formability. Specifically, it is an object of this invention to provide a new and improved process for the production of a highly desirable polyvinyl chloride base resin possessing good properties of flow and formability without substantial detriment to other resin properties, especially with respect to heat stability and heat distortion temperature. Other objects will appear hereinafter.

It has been discovered that when certain defined proportions of carbon tetrachloride are formulated into the suspension polymerization recipe, hereinafter defined, there results a base resin possessing good properties of flow and formability and also good properties of heat stability and heat distortion temperature without detriment to other resin properties. These properties are also exhibited after formulation into molding mixtures.

The process of the invention is conveniently carried out as a batch process. Briefly, it consists in the formation of a charge which includes the vinyl chloride monomer, an oil soluble peroxide polymerization catalyst, a water soluble synthetic emulsifying agent, a water soluble stabilizing hydrophilic colloid and carbon tetrachloride, in amounts hereinafter defined while keeping these materials dispersed in an excess of water by moderate agitation. The polymerization reaction is carried out in a closed reactor at moderately elevated temperatures.

The present process is generally carried out as follows: deionized water, polymerization catalyst, an emulsifying agent, and a stabilizing hydrophilic colloid is added to a suitable reaction vessel, a purge is then effected by the application of vacuum followed by the application of a small positive vinyl chloride pressure of such duration as to exclude oxygen. Nitrogen may be effectively substituted for vinyl chloride. The weighed charge of vinyl chloride monomer and carbon tetrachloride is then added, the charging valves closed, agitation begins and the reactor heated to reaction temperature. Hot water is preferred as the heating medium.

The reaction begins shortly after temperature is reached. The temperature is held constant until the reaction is almost complete. After this time the temperature begins to fall. When the reaction mixture has cooled to about room temperature, the contents of the reactor are discharged and the polymer is then isolated, washed and dried.

The following examples are given in illustration but are not intended as limitations on the scope of this invention. All parts and concentrations are by weight except where otherwise specified.

*Example I*

About 4 percent by weight carbon tetrachloride, based on the amount of vinyl chloride monomer, was added to a mixture consisting of 400 parts of vinyl chloride monomer, 900 parts deionized water, 1.2 parts lauroyl peroxide, 0.48 part sodium dioctyl sulfo succinate and 0.22 part of methyl cellulose.

These materials were charged to the reactor in the manner described. The heating was accompanied by agitation, the agitation being by means of a downward deflecting propeller type agitator top-mounted on the vessel and providing agitation to the extent of a Pfaudler Agitative Intensity Factor of about 4 (see Pfaudler Company, Rochester, New York, reprint No. 508 by O. W. Green). This condition is somewhat critical. When too much agitation is provided, the reaction mixture foams excessively and polymer forms on the upper part of the reactor. If insufficient agitation is provided, a lack of uniformity of product results and troublesome heat spots develop. A range of from 2 to 6 Pfaudler Agitative Intensity Factor will give fair results but a Pfaudler Agitative Intensity Factor of about 4 is preferred.

This polymerization was continued for 8⅓ hours at 55° C. After the polymerization was almost complete, the reactor was vented to the atmosphere and concurrently cooled to room temperature leaving a suspension of polymer particles which settled under the influence of gravity.

Treatment of this slurry or suspension was accomplished by feeding to a perforated bowl centrifuge and washing with deionized wash water containing 0.15 percent disodium phosphate dissolved therein. The polymer granules thus isolated were dried by a tray drying operation to contain less than 0.5 percent moisture.

Base polymer obtained from this process was then blended according to the following formulation:

100 parts resin
3 parts of a commercial stabilizer consisting of an organotin compound with a thio linkage
5 parts of a commercial compound consisting of hydrogenated terphenyl
2 parts of a commercial compound consisting of low molecular weight styrene compounds; principally dimers and trimers of styrene
½ part of a lubricant which is a castor oil derivative
¼ part of a lubricant which is the compound N,N' ethylene bis-stearamide.

This compound was then placed in an injection molding machine and the material released as a bar. Observations were made of the time required for each extrusion cycle of the injection molding machine, this being a measure of the processability of a plastic which is inversely proportional to the molding cycle. A sizeable quantity of the plastic material was processed and it was found that the average time required for a molding cycle was 34 seconds.

In the folowing example, it will be seen that by using an additional amount of carbon tetrachloride in the recipe processability is further improved.

*Example II*

About 8 percent by weight carbon tetrachloride was added to a charge otherwise identical in composition and proportions to the charge employed in the foregoing example except for the concentration of carbon tetrachloride. The polymerization was carried out under the same conditions. The polymer resulting therefrom was dried and formulated with the same ingredients and in the same proportions, placed in an injection molding machine, and the material formed as a bar. An average molding cycle during the processing of this plastic was 30 seconds.

*Example III*

About 12 percent by weight carbon tetrachloride was added to a charge otherwise identical in composition and proportions to the charge employed in the foregoing examples except for the carbon tetrachloride concentration. The polymerization was conducted under the same conditions. The polymer resulting therefrom was dried and formulated with the same ingredients and in the same proportions, placed in an injection molding machine, and the material formed as a bar. Processability was further improved.

*Example IV*

A charge identical in composition and proportions to the charges employed in the foregoing examples except that carbon tetrachloride was not included in the recipe, was polymerized under the same conditions. The polymer resulting therefrom was dried and formulated with the same ingredients and in the same proportions, placed in an injection molding machine and the material formed as a bar. The average molding cycle for an operation in this case was 40 seconds.

The foregoing experiments show that processability is greatly improved by the addition of carbon tetrachloride to the suspension polymerization charges, as shown by the reduction in time required for the injection molding machine cycle. Thus, it is clear that production increases of about 30 to 40 percent are made possible by the addition of controlled amounts of carbon tetrachloride through 12 percent concentration.

Further, the marked improvements in processability is not accompanied by significant adverse effects. Thus, comparison of the physical properties indicates the high quality of polymer obtained by the process of this invention. The maintenance of such high quality was indeed surprising for it had been previously found that improvements in processability were obtained only as a result of the deterioration of the physical properties of the resin, especially with respect to heat distortion temperature and heat stability. In the process of this invention, however, the important attributes of good resistance to heat distortion, and stability to elevated temperatures, are preserved. The benefit of maintenance of good heat stability properties is shown by the following example.

*Example V*

To demonstrate the heat stability of product of the present process, 100 parts of the base resin from Examples I–IV, inclusive, were separately blended, each with 50 parts of dioctyl phthalate and 3 parts dibutyltin dilaurate. A number of samples of these formulations was then placed in a forced draft oven at 300° F. It was found that each of the samples required about 120 minutes to discolor, showing conclusively that the heat stability of molding compositions was maintained at a high and satisfactory level.

None of the other resin properties were impaired in any manner. For example when the injection molding machine was dismantled and inspected after processing the polymers from Examples I, II or II, there was no substantial amount of gummy deposit left in the die and screw. There were no indications of decomposition caused by sticking in the heated apparatus.

*Example VI*

A further significant benefit arises from the fact that, when desired, processability of a polymer can be preserved at a level equal to that obtained by prior methods, and a product with a higher heat distortion temperature obtained. A base resin from the improved process wherein 8 percent carbon tetrachloride was employed in the recipe as in Example II was blended in the following proportions:

100 parts base resin
3 parts of a commercial stabilizer containing an organotin compound with a thio linkage
2 parts of a commercial product which consists of a mixture of low molecular weight styrene compounds; principally dimers and trimers of styrene
2 parts pigment (titanium dioxide, chrome yellow and carbon black mixed to give a gray composition)
½ part of a commercial lubricant which is a castor oil derivative
¼ part N,N' ethylene bis-stearamide which is used as a lubricant.

This formulation which yielded a plastic with a molding cycle of 40 seconds was injected from the injection molding machine. The heat distortion temperature of the extruded material was 58° C.

A base resin produced in the improved process, the process wherein 4 percent carbon tetrachloride was employed in the recipe as in Example I, was blended in the same proportions as given in the above example. This formulation, which yielded a plastic with a molding cycle of 40 seconds was also injected from the injection molding machine. The heat distortion temperature of the extruded material is 59° C. These materials were then equal in processability to the formulated plastic of Example IV, wherein no carbon tetrachloride was employed in the recipe, but the heat distortion temperature property is distinctly superior. A plastic formulated from a base resin resulting from a process wherein no carbon tetrachloride was employed in the recipe required 40 seconds for the injection molding cycle and had a heat distortion temperature of 55° C. Through the use of the base resin of this invention, improved formulation can be used which permits the attainment of equilavent processability without the concurrent loss of heat distortion temperature.

It will be clear from the foregoing that the objects of the invention are readily achieved through the use of small or minor quantities of carbon tetrachloride added to a charge. Generally, from 2 percent to about 12 percent of carbon tetrachloride is used, the larger proportions being used for greater increases in processability. This range is not absolutely limiting, although in virtually all cases at least 2 percent of carbon tetrachloride is used.

The polymerization is effected at a temperature of from 40 to 70° C. The lower limit of the temperature range is governed by the fact that at below 40° C. the rate of polymerization becomes too slow to be practical. At temperatures greater than 70° C. the base resin produced is of such poor quality that it is of little value for manufacturing useful articles of commerce. A preferable range of temperature is from 50° C. to 65° C. The best results are obtained by maintaining the polymerization mixture fairly uniform throughout the range of the cycle, although improved polymerization cycles employing deliberately varied temperature schedules can be used.

The concentration of the peroxide catalyst is not highly critical, but does affect the rate of polymerization. It is usually desirable to employ from about 0.1 percent to 3 percent thereof based on the weight of the vinyl chloride monomer. Below 0.1 percent the reaction rate becomes too slow and above 3 percent the polymer produced is subject to burning when milled. As already indicated an oil soluble organic peroxide is highly preferred. A preferable catalyst of this type is lauroyl peroxide. Illustrative of catalysts of this character which may be used are acetyl peroxide, dicaprylyl peroxide, stearoyl peroxide, acetyl benzoyl peroxide, diisopropyl benzene hydroperoxide and p-methane hydroperoxide. Mixtures of peroxide may be used if desired.

The polymerization should be carried out with an effective quantity of a water soluble hydrophilic colloid. This in conjunction with the emulsifying agent acts as a process stabilizing and anti-coagulation composition. Although methyl cellulose is a preferred component numerous other components may be used successfully. Illustrative of these are ethyl cellulose, hydroxy ethyl cellulose (glycol cellulose), carboxy methyl cellulose, gelatin, agar-agar and starch. In the case of methyl cellulose, preferred proportions are from about 0.02 to 0.07 parts per 100 of the monomer weight charged using a water:monomer ratio of 2.25:1. Though this is the preferable range, it is possible to use from 0.01 to 0.25 part per 100 of the monomer weight charged. Below a 0.01 concentration thereof coagulation is likely to occur. Above a 0.25 concentration thereof there will result undesirable product properties. For example, the particle size of the granular polyvinyl chloride produced may be too small or poor dry blending qualities will result.

Considerable latitude is also permissible with respect to the concentration of the emulsifying agent. The salts of sulfo alkyl succinates are a preferred class of emulsifying surface active materials. Other emulsifying agents which may be successfully used in the process are sorbitan monolaurate, a polyethylene glycol of sorbitan monolaurate, monopalmitate, mono-oleate, acetyl dimethyl benzoyl ammonium chloride and alkaryl sulfo succinates. Various condensation products of ethylene glycol and fatty alcohols can be substitutes for the sodium dioctyl sulfo alkyl succinates in the examples given. The proportions of the emulsifying agents to be added, based on a 2.25:1 water:monomer ratio is from about 0.07 to 0.3 parts per 100 of the monomer weight charged. A preferred range is from about 0.10 to 0.15 parts per 100 of the monomer weight charged. The preferred range for sodium dioctyl sulfo succinate, a preferred emulsifying agent, is from about .10 to about .15 part per 100 of the monomer weight charged for a water:monomer ratio of 2.25:1.

The vinyl chloride monomer employed in the present process should be polymerization grade with, preferably, the following specifications:

Acetylene content—less than 5 parts per million
Acetaldehyde content—less than 15 p.p.m.
Iron content—less than .5 p.p.m.
Polymerization rate test greater than 80% conversion in 5 hours.

The water employed as the polymerization medium and as a wash solution for the polymerized resin should be distilled or deionized, desirably with a minimum specific resistivity of 140,000 ohms at 18° C. In preparing a charge, the proportions of water should be at least 150 parts of water per 100 parts of vinyl chloride monomer initially introduced. Substantially larger amounts of water can be employed but such as excess serves no useful purpose. Generally it is preferred to provide water in the proportions of from 150 to 350 percent of the vinyl chloride monomer of the charge. The proportions of emulsifying agent and hydrophilic colloid employed are effected by the ratio of water in the charge. The proportions of these components as mentioned above can be altered proportionately with the quantity of water charged.

From the foregoing it is seen that the reaction system employed in the process of the present invention is very complex owing to the number of possible compounds which can be included in the recipe and to the possible variation in the amounts thereof and should therefore not be considered as rigid limitations. Therefore, although specific embodiments of the invention have been herein described, it is not intended to limit the invention solely thereto, but to include all the obvious variations and modifications falling within the spirit and scope of the appended claims.

What is claimed is:
1. A suspension polymerization process for the manufacture of an easily processed polyvinyl chloride which possesses good properties especially with respect to heat distortion temperature comprising forming a charge including vinyl chloride monomer, at least 150 parts of water, 0.1 to 3 parts of an oil soluble peroxide polymerization catalyst, from about 0.07 to 0.3 part of a water soluble synthetic emulsifying agent, from about 0.01 to about 0.25 part of a water soluble hydrophilic colloid and from 2 to about 12 parts of carbon tetrachloride, the proportion of water, catalyst, emulsifying agent and carbon tetrachloride being based on 100 parts by weight of the vinyl chloride monomer initially introduced; agitating said charge to provide a Pfaudler Agitative Intensity Factor of from about 2 to about 6 while heating and maintaining the charge at a temperature of 40 to 70° C.; and recovering the so-formed polymer.

2. The process of claim 1 wherein the charge also includes from about 0.02 to 0.07 part of methyl cellulose, based on 100 parts of monomer charged.

3. The process of claim 1 wherein the temperature of the charge is maintained within a range of from about 50° to about 65° C.

4. The process of claim 1 wherein the oil soluble peroxide polymerization catalyst is lauroyl peroxide.

5. The process of claim 1 wherein the water soluble synthetic emulsifying agent is a salt of a sulfoalkyl succinate.

6. The process of claim 1 wherein the charge contains water in sufficient quantity to provide a water:monomer ratio of from about 1.5:1 to about 3.5:1, from about 0.10 to about 0.15 part of a water soluble synthetic emulsifying agent and from about 0.02 to about 0.07 part of a water soluble hydrophilic colloid.

References Cited in the file of this patent

UNITED STATES PATENTS

| | | |
|---|---|---|
| 2,528,469 | Condo et al. | Oct. 31, 1950 |
| 2,647,107 | Barnes | July 28, 1953 |

FOREIGN PATENTS

| | | |
|---|---|---|
| 600,904 | Great Britain | Apr. 22, 1948 |
| 6,943 | Japan | Nov. 6, 1951 |

OTHER REFERENCES

D'Alelio: "Fundamental Principles of Polymerization," Wiley & Sons, Inc. (1952), N.Y., p. 204, second full para.